Dec. 28, 1965    R. H. PINTELL    3,226,584
INDUCED-QUADRATURE FIELD SYNCHRONOUS MOTOR
Filed June 10, 1960    3 Sheets-Sheet 1

Robert H. Pintell
*INVENTOR.*

Dec. 28, 1965    R. H. PINTELL    3,226,584
INDUCED-QUADRATURE FIELD SYNCHRONOUS MOTOR
Filed June 10, 1960    3 Sheets-Sheet 2

Robert H. Pintell
INVENTOR.

United States Patent Office 3,226,584
Patented Dec. 28, 1965

3,226,584
INDUCED-QUADRATURE FIELD
SYNCHRONOUS MOTOR
Robert H. Pintell, New York, N.Y., assignor to Intron International, Inc., Bronx, N.Y., a corporation of New York
Filed June 10, 1960, Ser. No. 35,184
8 Claims. (Cl. 310—162)

My present invention relates to an electric motor, particularly but not exclusively to a synchronous motor of the induced-quadrature type.

An induced-quadrature-field motor, as generally described in Patent No. 2,736,853 issued February 28, 1956, to P. J. Selgin, is an A.-C. motor having at least one pair of stator windings which are fed from an external source with alternating current and at least one pair of quadrature poles whose windings are interconnected but are independent of the external source. The quadrature circuit including the last-mentioned windings may contain a preferably adjustable capacitance, in series or in parallel, which serves to tune the inductance of these windings to a selected frequency determining the operating speed of the motor. The quadrature poles and the exciting poles, whose magnetic fields are derived from the stator windings which are fed from an A.-C. source, are alternatingly disposed circumferentially about a generally cylindrical rotor. The latter comprises one or more magnetic or magnetizable segments, one for each pair of stator poles, each dimensioned to bridge only two adjacent poles to complete a magnetic circuit which induces the flow of quadrature current.

It is the object of my present invention to provide an improved, inexpensive and relatively compact construction for an alternating-current motor which may be of the type described above.

According to a feature of the invention, I provide an alternating-current motor whose stator comprises several poles of high permeability sheet material angularly distributed about the circumference of a rotor disc, each pole having at least one broad, preferably flat face closely spaced from a surface of the rotor and substantially parallel to a corresponding portion of the latter surface. The rotor disc is divided by radial incisions into a plurality of highly permeable sectors that magnetically bridge two or more stator poles in certain angular positions in which the impressed and/or induced alternating flux through these poles is at or near its peak; at other times no bridging action occurs. With induced quadrature fields, the rotor sectors may be interconnected by a central portion of relatively high magnetic reluctance, each sector subtending an arc substantially equal to or slightly greater than 360°/N, N being the number of stator poles, whereby each sector will span two adjoining poles in a plurality of bridging positions but not in intermediate positions.

Another feature of my invention, designed further to simplify the construction of the stator part of the motor, resides in the provision of two pre-wound coils for each set of stator poles which pass on opposite sides of alternate members of such set and are energized in opposite directions. Thus, the current flow through the portion of both coils surrounding each pole is in the same sense as if the windings were coiled individually about the pole.

The rotor disc (and, if desired, the stator body) is preferably laminated to reduce undesirable eddy-current effects. Thus, the rotor disc may comprise laminae lying in planes transverse to the axis of the rotor and suitably bonded together, or a plurality of laminal rings concentric with the rotor shaft. The aforementioned sectors may then be formed by cutting out portions of the laminated disc. According to a more specific feature of the invention, the rotor disc is formed by spirally coiling a magnetizable band. The end of the band may be spot-welded to the body of the spiral to prevent its unraveling, whereupon the disc is vacuum-impregnated with an adhesive. The adhesive is, preferably, a thermosetting polymeric substance such as an epoxy resin. Sectoral portions may then be cut out from the disc to form the angularly spaced rotor sectors. If the band has previously been provided with an insulating coating on both surfaces, the laminae in the finished rotor disc will be electrically insulated from one another. I have found that a suitable band for this purpose is a silicon-steel tape having an oxide coating on both of its surfaces, this coating being sufficiently non-conductive so that additional insulating layers are unnecessary.

The above and other objects, features and advantages of my present invention will become more readily apparent from the following detailed description, reference being made to the accompanying drawing in which.

Figure 1:
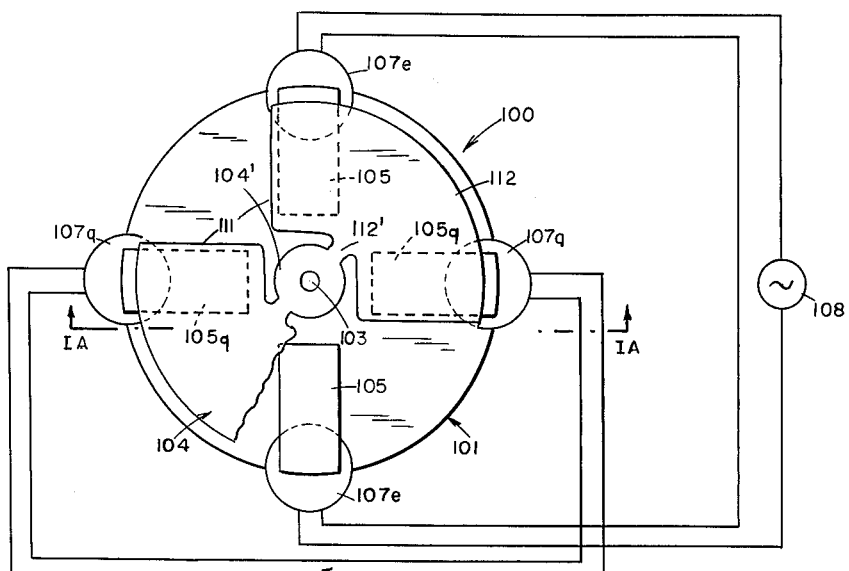
FIG. 1 is a top-plan view of a flat or "pancake"-type motor according to the invention.
Figure 1A:
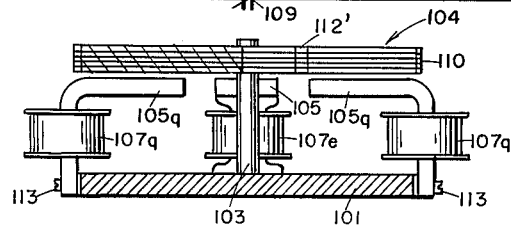
FIG. 1A is a cross-sectional view taken along line IA—IA of FIG. 1.

In FIGS. 1 and 1A I show an induced-quadrature-field motor 100 whose non-magnetic baseplate 101 centrally supports the shaft 103 of a rotor disc 104. The stator of the motor is formed from four elbow-shaped pole members 105, 105q which are equidistantly spaced about the baseplate 101 and are affixed thereto by means of bolts 113 threadedly engaging the baseplate along its periphery. The shanks of each of the elbow-shaped members lie in a plane transverse to the shaft 103 and parallel to the rotor disc 104, below the latter. Two opposite poles 105 are provided with exciting coils 107e while the other two poles are provided with quadrature-field coils 107q. The exciting coils 107e are connected directly across an A.-C. source 108, with opposite sense of energization, while the quadrature coils 107q are oppositely interconnected in series with a condenser 109. Rotor 104, which is formed from a plurality of planar laminae 110 disposed transversely to the shaft 103, is provided with two diametrically opposite sectoral cut-outs 111 which divide the rotor into two sectors 112 dimensioned so as to bridge, in a magnetic circuit, two of the poles 105, 105q.

In operation, the flux induced in exciter poles 105 by the external A.-C. source 108 is intermittently communicated by the rotating disc 104 to the quadrature poles 105q so as to induce in windings 107q a secondary current which maintains the rotation of the disc at a speed determined by the series capacitance 109 as described in the aforementioned Selgin patent. A high-reluctance path exists between the sectors 112 and the central portion 104' of the disc connected with these sectors by narrow necks 112'.

Figure 2:
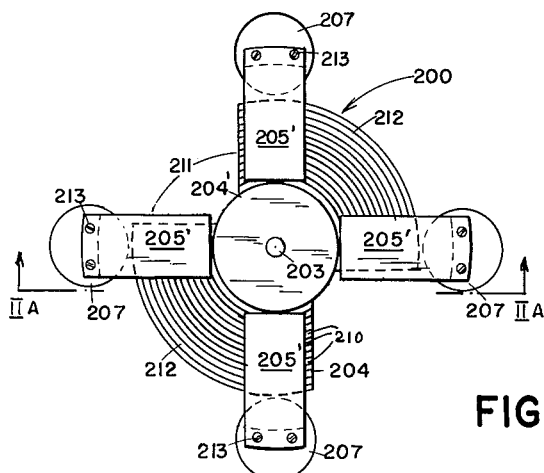
FIG. 2 is a view similar to FIG. 1 of another motor according to the invention.
Figure 2A:
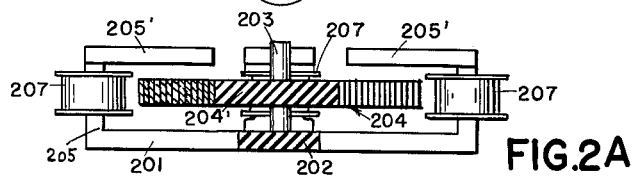
FIG. 2A is a cross-sectional view taken along line IIA—IIA of FIG. 2.

FIGS. 2 and 2A illustrate another two-pole motor 200 whose stator 201 is formed with four L-shaped pole pieces 205 which carry the coils 207 and to which substantially flat pole extensions 205' are affixed by screws 213. A rotor disc 204 is carried by a shaft 203 journaled in the non-magnetic central hub 202 which mechanically interconnects the arms 205. The rotor disc 204 lies in a plane parallel to the plane of the pole extensions 205' and is effectively sandwiched between the latter and the horizontal pole portions of the arms 205. A second center piece (not shown) of magnetically non-permeable material, similar to hub 202, may be provided above the rotor disc 204 so that the shaft 203 may be journaled at both of its extremities. The coils 207 may be connected in a circuit arrangement similar to that described with reference to FIG. 1, whereupon the operation of the two embodiments will be identical.

The rotor 204 is laminated from a plurality of annular strips 210 which are insulated electrically from each other and bonded together concentrically to form the disc. The center portion 204' of the disc consists of non-magnetic material. A pair of cut-outs 211 serve to divide the disc 204 into sectors 212, each of which is adapted to bridge two poles.

Figure 3:
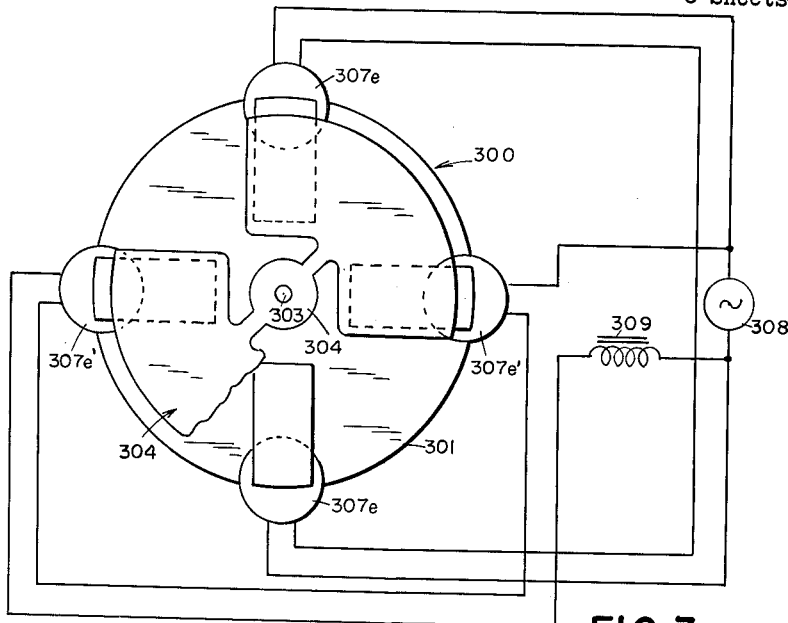
FIG. 3 is a view similar to FIG. 1 of a further embodiment.

The motor 300 shown in FIG. 3 is generally similar to that illustrated in FIG. 1 but has its four stator poles all energized from a source 308 of alternating current by way of external circuits. The poles 307e, forming a first diametrically opposite pair, are serially connected directly across the source 308 whereas the poles 307e', constituting a second such pair at right angles to the first, are coupled to that source through the intermediary of a phase-shifting impedance here shown as an inductance 309. Here, too, the sectors of the rotor disc 304 intermittently bridge adjacent stator poles as the disc rotates, the bridging occurring in the preferred mode (synchronous rotor speed) when the fluxes in these adjacent poles are equal and opposite, i.e. when their phase angles are ±45° or ±135°, so that the number of lines of magnetic force concentrated in each rotor sector will be a maximum.

Figure 4:
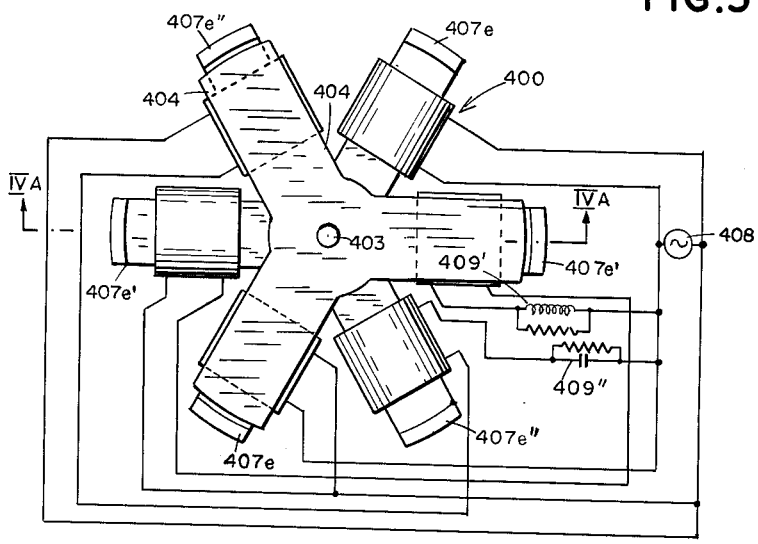
FIG. 4 is a top-plan view of a six-pole motor according to a further embodiment of the invention.
Figure 4A:
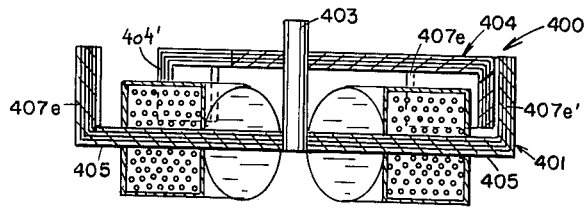
FIG. 4A is a cross-sectional view taken along line IVA—IVA of FIG. 4.

FIGS. 4 and 4A show a modified motor 400 with three pairs of stator poles 407e, 407e' and 407e'' respectively energized from an A.-C. source 408 directly, through a phase shifter 409' introducing a 60° lag, and through a phase shifter 409'' introducing a 60° lead. The rotor 404, carried on a shaft 403, is Y-shaped and consists in its entirety of ferromagnetic material, its three arms being bent over at the ends to form depending flanges 404' which pass close to similar, upstanding flanges of the stator body 401. The latter flanges, constituting the aforementioned stator poles, are arrayed in a circle just outside the cylindrical orbit of the flanges 404' and are magnetically interconnected in groups of three by the rotor 404 in certain angular positions of the latter which, as in the preceding embodiment, provide for the passage of a maximum flux through these poles at the instant of bridging. Thus there exists again a synchronous speed at which the rotor will preferentially turn.

Figure 5:
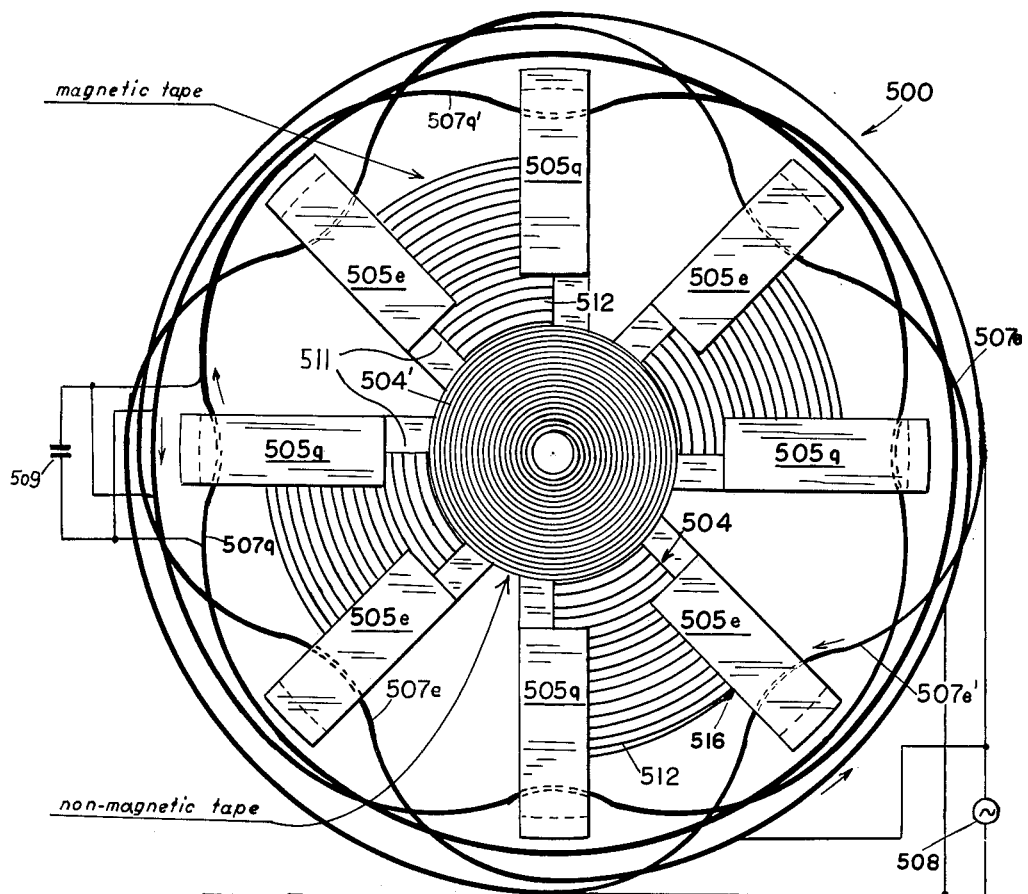
FIG. 5 is a top-plan view of still another motor according to the invention.

In FIG. 5 I show a four-pole motor 500 which has four exciting poles 505e and four quadrature poles 505q alternatingly spaced about a stator 501 which also supports a rotor 504. The latter is formed by winding around a non-magnetic hub 504' a tape of silicon steel having oxidized surfaces in a spiral, spot-welding the loose end to the spiral body at 516, and then vacuum-impregnating the spiral body with a preferably thermosetting synthetic resin (e.g. epoxy resin). The rotor 504 is then divided into four sectors 512 by a slotting or punching operation which form cut-outs 511 extending to the hub 504'; this hub, in turn, may be spirally wound from a similar tape of non-magnetic material forming an extension of the magnetic tape which constitutes the sectors of rotor 504.

Two pre-formed coils 507e and 507e' are alternately disposed on opposite sides of successive exciting poles 505e and are connected in parallel to an A.-C. source 508 so that the current flows through each coil in opposite directions. The exciting poles then have the same magnetic characteristics as poles individually wound with coils as, for example, described with reference to FIG. 1. Two other pre-formed coils 507q and 507q' are similarly wrapped about the quadrature poles 505q and connected to a phase-shifting condenser 509. The motor operates in a manner analogous to the operation of the four-pole motor of FIG. 3 and the two-pole motor of FIG. 1.

The invention illustrated and described may be modified or varied in many ways believed to be within the ability of persons skilled in the art, e.g. by substitution of elements to the extent to which such substitution is compatible. These and similar modifications and variations are not deemed as exercise of independent invention and are intended to be included within the spirit and scope of the present invention as defined by the appended claims.

I claim:

1. A motor comprising a stator and a rotor having a common axis, said stator including a plurality of pairs of diametrically opposite poles angularly spaced about said axis, said poles each including a generally L-shaped member of high-permeability sheet material having a first leg provided with winding means and a second leg presenting a broad face to said rotor, said rotor being essentially in the shape of a flat disc divided into generally flat, angularly spaced sectors with major portions lying in the same plane transverse to said axis, said sectors being separated by gaps of high magnetic reluctance and electric resistance, each of said sectors having at least an extremity of magnetically permeable material provided with a broad surface juxtaposable with said broad face of each of said poles in successive angular positions, the number of said sectors equaling the number of pole pairs, said sectors registering only with alternate poles in certain angular positions of said rotor.

2. A motor according to claim 1 wherein said extremity is bent into an arcuate flange transverse to said plane, the flanges of all of said sectors having a common cylindrical orbit, the second legs of said poles being arrayed in a circle adjacent said orbit.

3. A motor according to claim 1 wherein each of said poles has portions including said second legs lying in parallel planes transverse to said axis on opposite sides of said disc.

4. A rotor for an alternating-current motor, comprising a disc with a non-magnetic central portion and an outer peripheral portion composed of arcuate laminations of magnetically permeable material separated by non-magnetizable layers, said peripheral portion being divided into sectors by a plurality of angularly spaced incisions penetrating to said central portion.

5. A motor comprising a stator with an even number of pairs of diametrically opposite poles angularly offset from one another about an axis, first winding means on half the number of said pole pairs, second winding means on the remaining pole pairs, means including said winding means and a source of alternating current for producing relatively dephased alternating magnetic fields in said poles, and a rotor rotatable about said axis, each of said poles including a generally L-shaped member having a first portion provided with the respective winding means and a second portion presenting a broad face to said rotor, said rotor being essentially in the shape of a flat disc divided into generally flat, angularly spaced sectors confronting the second legs of said poles and consisting at least in part of magnetically permeable material, said sectors forming a low-reluctance path interlinking a plurality of said second legs, one from each pole pair, in certain angular positions of said rotor and interlinking said second legs of the remaining poles in other angular positions thereof.

6. A motor according to claim 5 wherein each of said winding means comprises two first pre-formed coils respectively passing on opposite sides of each pole of said half the number of pole pairs with reversal of position as between successive poles, and two second pre-formed coils respectively passing on opposite sides of each pole of said remaining pole pairs with reversal of position as between successive poles.

7. A motor according to claim 6 wherein said first coils pass on the same side of each pole of said remaining pole pairs whereas said second coils pass on the same side of each pole of said half the number of pole pairs.

8. A motor comprising a stator and a rotor having a common axis, said stator including a plurality of pairs of diametrically opposite poles each consisting at least in part of a generally L-shaped member of high-permeability sheet material having a first leg provided with winding means and a second leg presenting a broad face to said rotor, said rotor including a plurality of arms angularly spaced about said axis and extending generally radially outwardly in a plane transverse thereto, said arms being separated by gaps of high magnetic reluctance and electric resistance, said arms having broad-faced portions of laminated magnetically permeable sheet material confronting the second legs of said poles, the number of said arms equaling the number of pole pairs, said arms registering only with alternate poles in certain angular positions of said rotor.

References Cited by the Examiner
UNITED STATES PATENTS

| | | | |
|---|---|---|---|
| 1,897,184 | 2/1933 | Zopp | 310—268 |
| 3,060,337 | 10/1962 | Baudot | 310—268 |

ORIS L. RADER, *Primary Examiner.*

MILTON O. HIRSHFIELD, *Examiner.*